(12) United States Patent
Kurita et al.

(10) Patent No.: US 9,392,672 B2
(45) Date of Patent: Jul. 12, 2016

(54) LIGHT SOURCE APPARATUS AND DISPLAY APPARATUS

(71) Applicant: CANON KABUSHIKI KAISHA, Tokyo (JP)

(72) Inventors: Masanao Kurita, Isehara (JP); Masahiro Kamiyoshihara, Kamakura (JP); Yasuhiro Matsuura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/728,231

(22) Filed: Jun. 2, 2015

(65) Prior Publication Data

US 2015/0359067 A1   Dec. 10, 2015

(30) Foreign Application Priority Data

Jun. 5, 2014  (JP) .................................. 2014-116468
Mar. 24, 2015  (JP) .................................. 2015-061208

(51) Int. Cl.
| | |
|---|---|
| H05B 37/02 | (2006.01) |
| H05B 39/04 | (2006.01) |
| H05B 41/36 | (2006.01) |
| H05B 33/08 | (2006.01) |
| G09G 3/34 | (2006.01) |
| G02F 1/1335 | (2006.01) |

(52) U.S. Cl.
CPC ...... *H05B 37/0218* (2013.01); *G02F 1/133603* (2013.01); *G02F 1/133611* (2013.01); *G09G 3/3406* (2013.01); *H05B 33/0848* (2013.01); *G02F 2001/133601* (2013.01); *G02F 2001/133612* (2013.01); *G02F 2201/58* (2013.01); *G09G 2360/145* (2013.01)

(58) Field of Classification Search
None
See application file for complete search history.

(56) References Cited

U.S. PATENT DOCUMENTS

| | | | | |
|---|---|---|---|---|
| 8,287,149 | B2 * | 10/2012 | Hamada | 362/249.02 |
| 2008/0219003 | A1 * | 9/2008 | Park | 362/247 |
| 2008/0259241 | A1 | 10/2008 | Morimoto | |
| 2010/0296266 | A1 | 11/2010 | Dussault et al. | |
| 2014/0055037 | A1 * | 2/2014 | Kurita | 315/151 |

FOREIGN PATENT DOCUMENTS

| | | |
|---|---|---|
| JP | 2001-142409 A | 5/2001 |
| JP | 2007-148177 A | 6/2007 |
| JP | 2007-323857 A | 12/2007 |
| JP | 2009-103916 A | 5/2009 |
| JP | 2009-158506 A | 7/2009 |
| JP | 2009-265661 A | 11/2009 |

(Continued)

OTHER PUBLICATIONS

European Partial Search Report issued on Oct. 28, 2015, that issued in the corresponding European Patent Application No. 15166699.7.

(Continued)

*Primary Examiner* — Anh Tran

(74) *Attorney, Agent, or Firm* — Cowan, Liebowitz & Latman, P.C.

(57) ABSTRACT

A light source apparatus according to the present invention, includes a substrate, a plurality of light source units provided on the substrate, a partition wall provided on the substrate and surrounding each of the light source units, and an optical sensor disposed between two or more of the light source units that are adjacent to each other, wherein the number of optical sensors is lower than the number of light source units.

18 Claims, 14 Drawing Sheets

(56) References Cited

FOREIGN PATENT DOCUMENTS

| | | |
|---|---|---|
| JP | 2010-044180 A | 2/2010 |
| JP | 2011-027941 A | 2/2011 |
| JP | 2013-211176 A | 10/2013 |
| JP | 2014-044828 A | 3/2014 |

OTHER PUBLICATIONS

The above foreign patent documents were cited in the May 10, 2016 Japanese Office Action, which is unclosed without an English Translation, that issued in Japanese Patent Application No. 2015-061208.

* cited by examiner

LIGHT SOURCE APPARATUS AND DISPLAY APPARATUS

BACKGROUND OF THE INVENTION

1. Field of the Invention

The present invention relates to a light source apparatus and a display apparatus.

2. Description of the Related Art

Among the color image display apparatuses are ones that have a color liquid crystal panel with a color filter and a light source apparatus (backlight apparatus) for irradiating the back of the color liquid crystal panel with white light. Fluorescent lamps such as cold cathode fluorescent lamps (CCFLs) have conventionally been used mainly as the light-emitting elements of the light source apparatuses. In recent years, however, light-emitting diodes (LEDs) have been increasingly used as the light-emitting elements of the light source apparatuses as they are excellent in terms of power consumption, life duration, color reproducibility, and environmental burden.

The light source apparatuses that use LEDs as the light-emitting elements (LED backlight apparatuses) generally have a large number of LEDs. Japanese Patent Application Publication No. 2001-142409 discloses an LED backlight apparatus having a plurality of light sources (light-emitting parts) each of which has one or more LEDs. Japanese Patent Application Publication No. 2001-142409 also discloses controlling the light emission brightness of each light source. By dropping the light emission brightness of the light sources that emit light to the regions on the screen of the color image display apparatus where a dark image is displayed, power consumption can be reduced, improving the contrast of the displayed image (the image displayed on the screen). This type of light emission control in accordance with the characteristics of an image is called "local dimming control."

Suppressing the expansion of light emitted from each light source can enhance the level of improvement of the contrast through local dimming control. Specifically, suppressing a leak of light emitted from each light source to the regions corresponding to the other light sources can enhance the level of improvement of the contrast through local dimming control. Japanese Patent Application Publication No. 2009-103916 discloses a structure in which each light source is surrounded with a partition wall (described hereinafter as "individual partition structure"). The individual partition structure is also called "a structure in which each of the light sources is isolated from other light sources by the partition wall." In the individual partition structure, the expansion (leak) of light emitted from the light sources can be suppressed because the partition wall can shield the light that is emitted from a light source to other light source.

On the other hand, a problem with the light source apparatuses is that the light emission characteristics of each light source change. Changes in the light emission characteristics occur due to, for example, changes in the temperatures of the light sources, time-related deterioration of the light sources, and the like. In a light source apparatus with a plurality of light sources, variations in the light emission characteristics of the plurality of light sources occur due to variations in the temperatures or levels of time-related deterioration of the plurality of light sources. This, as a result, causes variations in the light emission brightness of the plurality of light sources and variations in emission colors of the plurality of light sources. Variations in the light emission characteristics of the plurality of light sources cause the light source apparatus to generate uneven light. For instance, when the light emission brightnesses of the plurality of light sources fluctuate, the light source apparatus generates light of uneven brightness. When the emission colors of the plurality of light sources fluctuate, the light source apparatus generates light of uneven colors.

As a technique for reducing such changes in light emission brightnesses, changes in emission colors, uneven brightnesses and uneven colors, there is known a technique for adjusting light of a light source by using an optical sensor that detects the light emitted from the light source. Specifically, there is known a technique for adjusting light of a light source based on a detection value of an optical sensor that is provided to detect the light reflected off an optical sheet (optical member) of the light source apparatus at the light source side. A light source apparatus with a plurality of light sources performs a process of turning the light sources on sequentially and detecting reflected light to adjust the emitted light for each light source. Such technique is disclosed in, for example, Japanese Patent Application Publication No. 2013-211176.

It is preferred that the number of optical sensors and the number of processing circuits for processing the output signals of the optical sensors be low for the purpose of reducing the costs. For instance, instead of providing an optical sensor and a processing circuit with respect to each light source, it is preferred that an optical sensor and a processing circuit be provided for every two or more light sources.

However, when an optical sensor corresponding to two or more light sources is provided in a light source apparatus having the individual partition structure, the light moving from the light sources to the optical sensor is shielded by the partition wall. As a result, an adequate amount of light cannot enter the optical sensor, causing deterioration in the accuracy of detection of light emitted from the light sources.

SUMMARY OF THE INVENTION

The present invention provides a technique capable of detecting, at low cost and with high accuracy, light that is emitted from each of the light sources of a light source apparatus having the individual partition structure.

The present invention in its first aspect provides a light source apparatus, comprising:
a substrate;
a plurality of light source units provided on the substrate;
a partition wall provided on the substrate and surrounding each of the light source units; and
an optical sensor disposed between two or more of the light source units that are adjacent to each other,
wherein the number of optical sensors is lower than the number of light source units.

The present invention in its second aspect provides a light source apparatus, comprising:
a substrate;
a plurality of light source units provided on the substrate;
a partition wall provided on the substrate and surrounding each of the light source units;
a plurality of optical sensors configured to detect light emitted from the light source units; and
a plurality of processing circuits configured to process output signals of the optical sensors,
wherein the number of processing circuits is lower than the number of optical sensors, and
the processing circuits process output signals of two or more of the optical sensors.

The present invention in its third aspect provides a light source apparatus, comprising:
a substrate;
a plurality of light source units provided on the substrate;
a partition wall provided on the substrate and surrounding each of the light source units; and an optical sensor disposed between two or more of the light source units that are adjacent to each other, wherein the optical sensor is disposed in a position where light that enters the optical sensor from each of the two or more light source units that are adjacent to each other is affected by the partition wall at substantially an equal degree.

The present invention in its fourth aspect provides a display apparatus, comprising:

the light source apparatus; and a display unit configured to display an image on a screen by modulating light emitted from the light source apparatus.

According to the present invention, light that is emitted from each of the light source units of the light source apparatus having the individual partition structure can be detected at low cost and with high accuracy.

Further features of the present invention will become apparent from the following description of exemplary embodiments with reference to the attached drawings.

DESCRIPTION OF THE EMBODIMENTS

Embodiment 1

A display apparatus, a light source apparatus, and a method for controlling these apparatuses according to Embodiment 1 of the present invention are described below.

The present embodiment describes an example in which the light source apparatus is a backlight apparatus used in a color image display apparatus; however, the light source apparatus is not limited to the backlight apparatus used in a display apparatus. The light source apparatus may be, for example, a streetlight, indoor illumination, microscopic illumination, and other illumination apparatuses.

Furthermore, the present embodiment describes an example in which the display apparatus is a transmissive liquid crystal display apparatus, but the display apparatus is not limited thereto. The display apparatus according to the present embodiment may be a display apparatus that displays an image on a screen by modulating light emitted from the light source apparatus. For instance, the display apparatus according to the present embodiment may be a reflective liquid crystal display apparatus. The display apparatus according to the present embodiment may be a micro-electromechanical system (MEMS) shutter display that uses a MEMS shutter in place of a liquid crystal element. The display apparatus may also be a monochrome image display apparatus.

Figure 1:
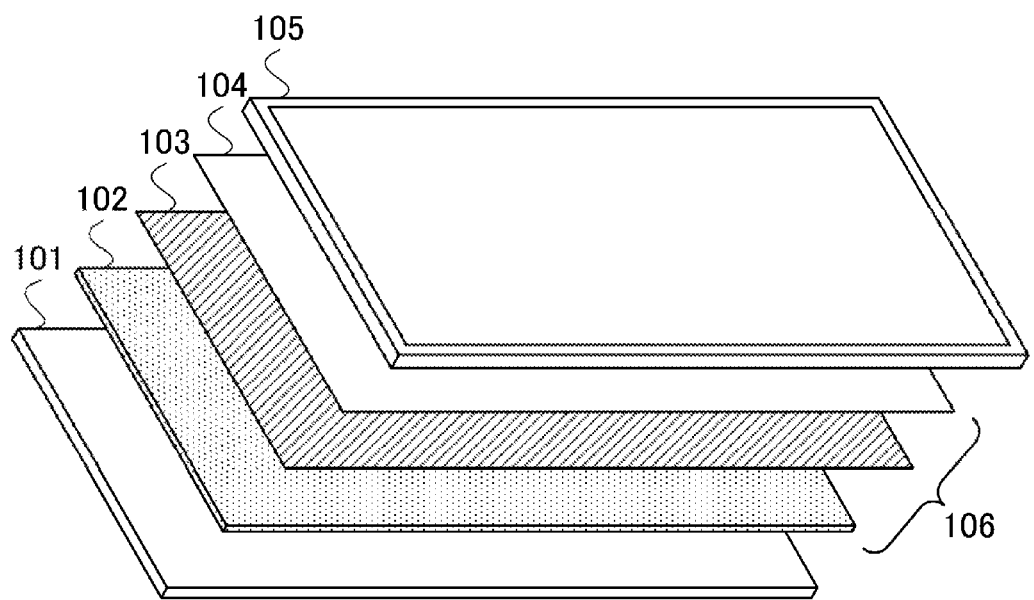
FIG. 1 is a schematic diagram showing an example of the configuration of a color image display apparatus according to Embodiment 1.

FIG. 1 is a schematic diagram showing an example of the configuration of a color image display apparatus according to the present embodiment. The color image display apparatus has a backlight apparatus and a color liquid crystal panel 105. The backlight apparatus has a light source substrate 101, a diffuser 102, a light-condensing sheet 103, a reflective polarizing film 104, and the like.

The light source substrate 101 emits light (white light) to be irradiated onto the back of a color liquid crystal panel 105. The light source substrate 101 is provided with a plurality of light source units. The light source units each have one or more light-emitting elements. Light-emitting diodes (LEDs), cold cathode tubes, organic EL elements and the like can be used as the light-emitting elements. The present embodiment describes an example in which LED chips are used as the light-emitting elements.

The diffuser 102, light-condensing sheet 103, and reflective polarizing film 104 are provided to face the light source units. The diffuser 102, light-condensing sheet 103, and reflective polarizing film 104 are disposed in substantially parallel (or parallel) to the light source substrate 101 to optically change the light emitted from the light source substrate 101 (the light source units, to be precise).

Specifically, the diffuser 102 causes the light source substrate 101 to function as a surface light source by diffusing the light emitted from the plurality of light source units.

The light-condensing sheet 103 improves the front brightness (brightness in the front direction (on the color liquid crystal panel 105 side)) by condensing, in the front direction, white light that is diffused by the diffuser 102 and enters at various incidence angles.

The reflective polarizing film 104 improves the front brightness by efficiently polarizing the incident white light.

The diffuser 102, light-condensing sheet 103 and reflective polarizing film 104 are overlapped with one another. Hereinafter, these optical members are generically called "optical sheet 106." It should be noted that the optical sheet 106 may include a member other than the foregoing optical members and may not include at least any of the foregoing optical members. In addition, the optical sheet 106 and the color liquid crystal panel 105 may be integrated.

The color liquid crystal panel 105 is a display part that displays an image on the screen by transmitting the light coming from the backlight apparatus. Specifically, the color liquid crystal panel 105 has a plurality of pixels composed of an R factice pixel transmitting red light, a G factice pixel transmitting green light, and a B factice pixel transmitting blue light, and displays a color image by controlling the brightness of the radiated white light for each factice pixel.

The backlight apparatus having the foregoing configuration (the configuration shown in FIG. 1) is generally called "direct backlight apparatus."

Figure 2:
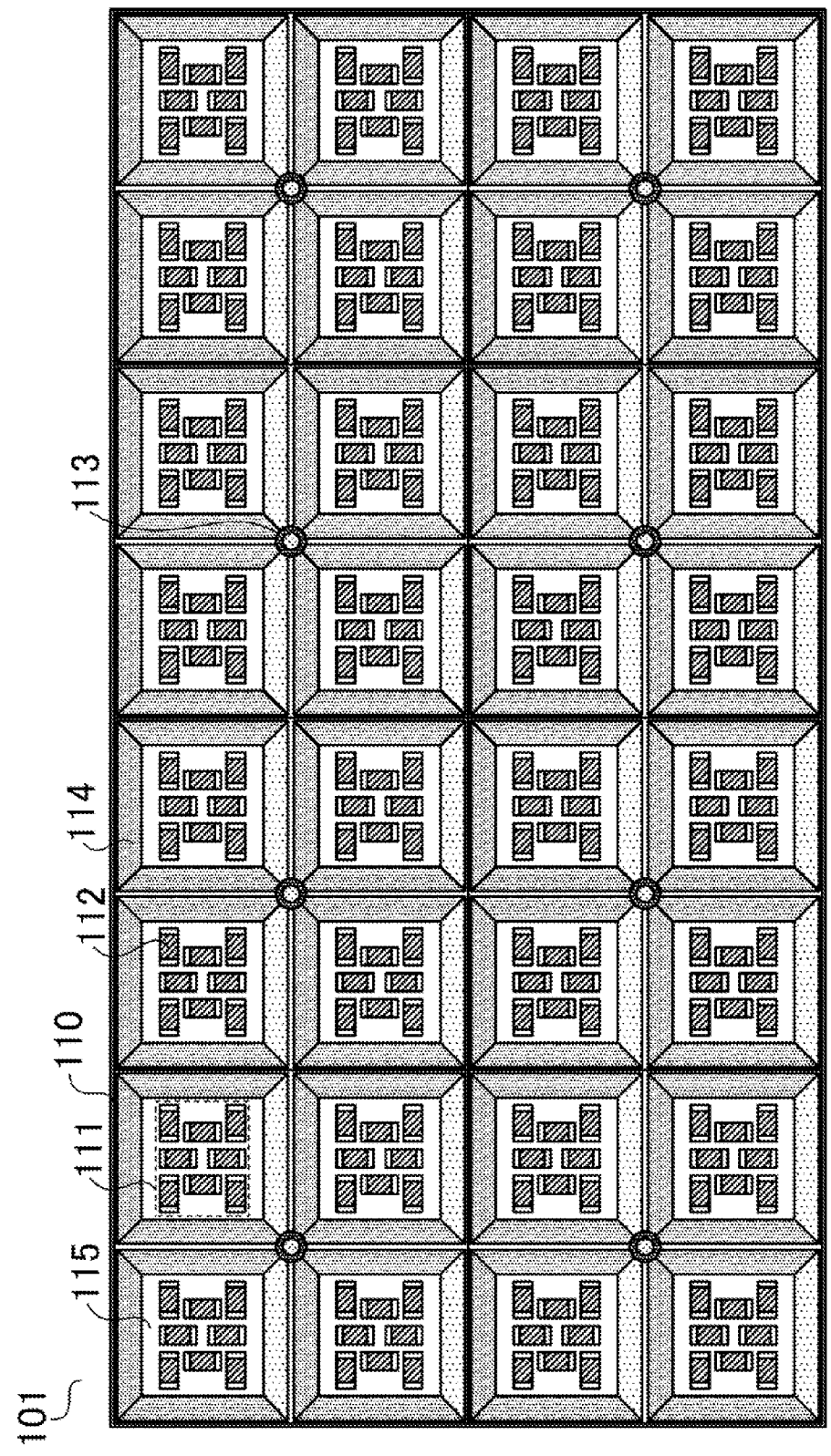
FIG. 2 is a front view showing an example of the configuration of a light source substrate according to Embodiment 1.

FIG. 2 is a schematic diagram showing an example of the configuration of the light source substrate 101 viewed from the front (the color liquid crystal panel 105 side).

Figure 3:
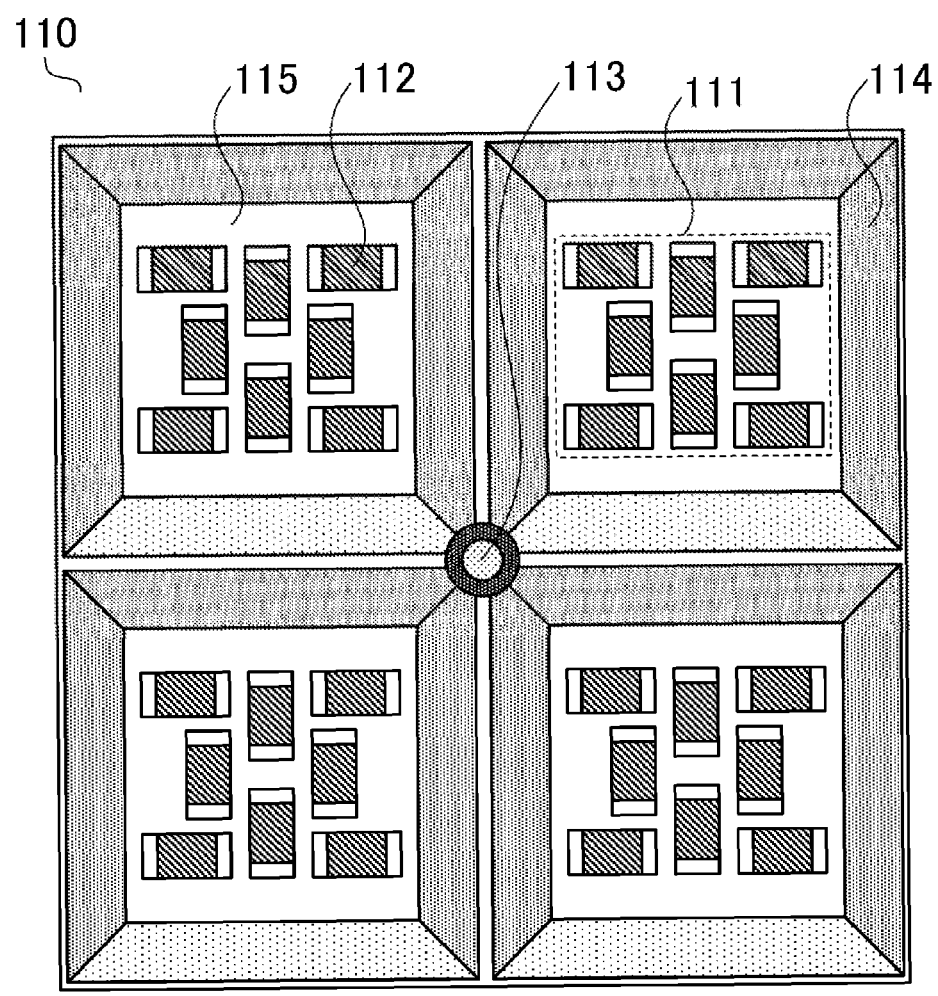
FIG. 3 is a front view showing an example of the configuration of an LED substrate according to Embodiment 1.

FIG. 3 is a schematic diagram showing an example of the configuration of an LED substrate 110 viewed from the front.

In the example shown in FIG. 2, the light source substrate 101 has a total of eight LED substrates 110 arranged in 2 rows×4 columns. The light source substrate 101 is also provided with a partition wall 114 and optical sensors 113.

As shown in FIG. 3, a region of each of the LED substrates 110 is divided into a total of four divided regions, arranged in 2 rows×2 columns, by the partition wall 114. Also, as shown in FIG. 2, a region of the light source substrate 101 is divided into a total of thirty-two divided regions 115, arranged in 4 rows×8 columns, by the partition wall 114.

As shown in FIGS. 2 and 3, each of the divided regions 115 is provided with a light source unit 111 having eight LED chips 112. The spaces in the row and column directions of the light source unit 111 are constant.

In other words, the light source substrate 101 is provided with a total of thirty-two light source units 111, arranged in 4 rows×8 columns, wherein each of the light source units 111 is isolated from other light source units 111 by the partition wall 114. Light emission of the thirty-two light source units 111 (at least either the light emission brightnesses or emission colors) can be controlled individually.

In the present embodiment, a group of two or more light source units has one optical sensor. Specifically, as shown in FIGS. 2 and 3, the optical sensors 113 are provided in the respective LED substrates 110. In other words, a single optical sensor 113 is provided with respect to a total of four light source units 111 arranged in 2 rows×2 columns. In addition, the optical sensor 113 is disposed in such a manner as to be overlapped with the partition wall 114 when viewed in a direction perpendicular to the light source substrate 101 (LED substrate 110).

In the examples shown in FIGS. 2 and 3, when viewed in the direction perpendicular to the light source substrate 101 (LED substrate 110), a single optical sensor 113 is provided between the four light source units 111 that are adjacent to one another. Furthermore, when viewed in the direction perpendicular to the light source substrate 101 (LED substrate 110), a single optical sensor 113 is provided between the four divided regions 115 that are adjacent to one another. The centers of the four adjacent light source units 111 are apart from the optical sensor 113 at an equal distance. The optical sensor 113 is disposed in the position where the light that enters the optical sensor 113 from each of the four adjacent light source units 111 is affected by the partition wall 114 at substantially an equal degree.

A white LED can be used as the LED chips 112. A plurality of LEDs emitting different colors of light (e.g., red LED emitting red light, green LED emitting green light, blue LED emitting blue light, etc.) can be used as the plurality of LED chips 112 of each light source unit 111. For example, a plurality of LEDs that are selected in such a manner that white light is emitted from the light source units 111 can be used as the plurality of LEDs emitting different colors of light. Specifically, a total of eight LEDs, that is, two red LEDs, four green LEDs and two blue LEDs, can be used as the plurality of LED chips 112 of each light source unit 111. The light emission brightness of each light source unit 111 and the color of light emitted from each light source unit 111 can be controlled by using the plurality of LEDs emitting different colors of light.

The partition wall 114 has shielding surfaces corresponding to each light source unit to shield the light that is emitted from a light source unit to other light source unit. In other words, the partition wall 114 has shielding surfaces corresponding to each light source unit to surround each light source unit. By shielding the light that is emitted from one of the light source units 111 to reach the other light source units 111, the expansion of the light emitted from the light source unit 111 can be suppressed. As a result, the contrast of the displayed image (the image displayed on the screen) can be improved through local dimming control. Local dimming control is a light emission control for each light source unit in accordance with the characteristics of an image (image data to be displayed).

In the present embodiment, the shielding surfaces have high reflectivity and the light that is emitted from the light source units 111 is reflected off the shielding surfaces. Specifically, the light emitted from the light source units 111 is reflected off the shielding surfaces and returned to the divided regions 115 surrounded by the shielding surfaces. For this reason, the shielding surfaces can also be called "reflecting surfaces." Because the light emitted from the light source units 111 is reflected off the shielding surfaces, the light emitted from the light source units 111 can be averaged sufficiently within the divided regions 115 provided with these light source units 111. As a result, the contrast of the displayed image can be improved through the local dimming control.

It should be noted that the material of the partition wall 114 is not particularly limited. For example, the partition wall 114 is formed with white resin having high reflectivity.

The light emitted from the light source units 111 does not have to be reflected off the shielding surfaces. The light emitted from the light source units 111 may be absorbed by the partition wall 114 through the shielding surfaces.

The optical sensors 113 detect the light emitted from the light source units 111. For instance, the four light source units 111 shown in FIG. 3 are turned on sequentially one by one, and then the single optical sensor 113 sequentially detects the light emitted from each of the four light source units 111.

A brightness sensor for detecting the brightness of the light emitted from each light source unit 111 (a photodiode, phototransistor, etc.) can be used as the optical sensor 113. A color sensor for detecting the color of the light emitted from each light source unit 111 can also be used as the optical sensor 113. An optical sensor for detecting both the brightness and color of the light emitted from each light source unit 111 can also be used as the optical sensor 113.

It should be noted that the present embodiment describes an example in which the light source substrate 101 has eight LED substrates 110; however, the number of LED substrates 110 may be higher or lower than 8. The light source substrate 101 may have only one LED substrate 110.

Although the present embodiment describes an example in which a single LED substrate 110 is provided with four light source units 111 and the light source substrate 101 is provided with thirty-two light source units 111, the configuration of the present embodiment is not limited thereto. The number of light source units provided in a single LED substrate 110 may be higher or lower than 4. Also, the number of light source units provided in the light source substrate 101 may be higher or lower than 32.

Although the present embodiment describes an example in which a single optical sensor 113 is provided in a single LED substrate 110, the configuration of the present embodiment is not limited thereto. For example, one optical sensor 113 may be provided for every two or more LED substrates 110.

Figure 13:
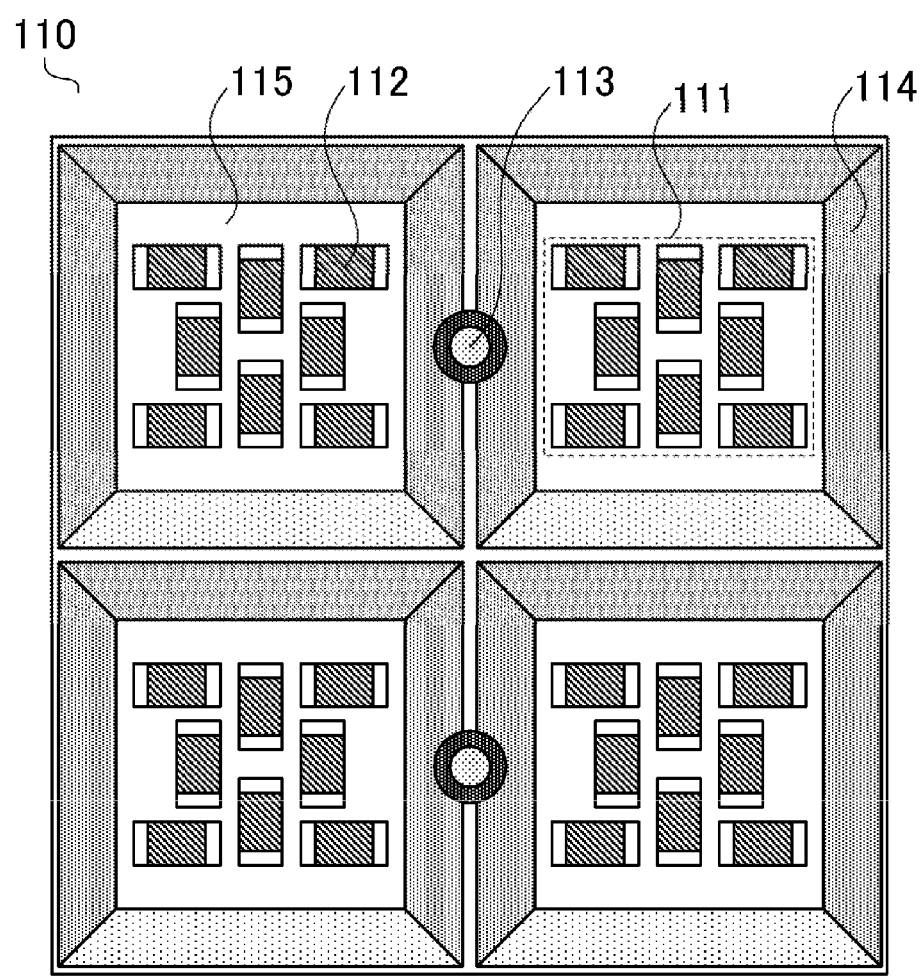
FIG. 13 is a front view showing other example of the configuration of the LED substrate according to Embodiment 1.

Also, a single LED substrate 110 may have two or more optical sensors 113. For instance, as shown in FIG. 13, a single optical sensor 113 corresponding to two adjacent light source units 111 may be provided between these two light source units 111 when viewed in the direction perpendicular to the light source substrate 101 (LED substrate 110). In this case, two optical sensors 113 are provided in one LED substrate 110. In this case as well, the optical sensors 113 are disposed in such a manner as to be overlapped with the partition wall 114 when viewed in the direction perpendicular to the light source substrate 101 (LED substrate 110). Moreover, a single optical sensor 113 is provided between two adjacent divided regions 115 when viewed in the direction perpendicular to the light source substrate 101 (LED substrate 110). The centers of the two adjacent light source units 111 are apart from the optical sensor 113 at an equal distance. The optical sensor 113 is disposed in the position where the light that enters the optical sensor 113 from each of the two adjacent light source units 111 is affected by the partition wall 114 at substantially an equal degree.

Moreover, the light source substrate 101 may have only one optical sensor 113.

In addition, the distances from the centers of a plurality of adjacent light source units 111 to the corresponding optical sensor 113 do not have to be completely equal to each other. The centers of the plurality of adjacent light source units 111 may be apart from the corresponding optical sensor 113 at substantially an equal distance.

Although the present embodiment describes an example in which one light source unit 111 has eight LED chips 112, the configuration of the present embodiment is not limited thereto. The number of LED chips 112 provided in a single light source unit 111 may be higher or lower than 8. A single light source unit 111 may have only one LED chip 112.

Although the present embodiment describes an example in which the shape of the divided regions 115 is a quadrangle, the shape of the divided regions 115 is not limited thereto. For instance, the shape of the divided regions 115 may be a triangle, a pentagon, a hexagon, a circle, and the like.

Figure 14:
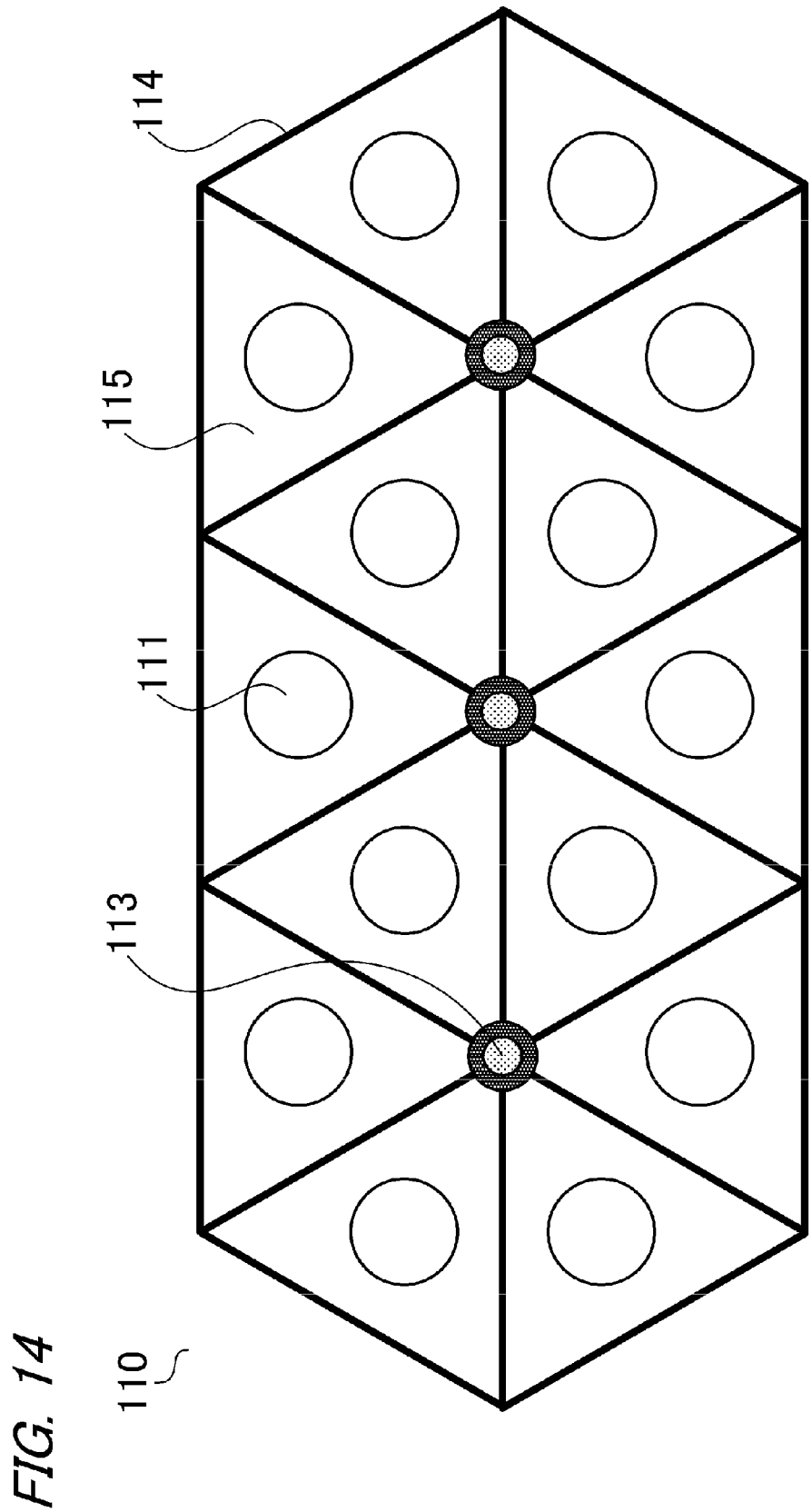
FIG. 14 is a front view showing other example of the configuration of the light source substrate according to Embodiment 1.

FIG. 14 is a diagram showing an example in which the shape of the divided regions 115 is a triangular shape. In this case, one optical sensor 113 is provided among six adjacent divided regions 115 when viewed in the direction perpendicular to the light source substrate 101 (LED substrate 110). The centers of the six adjacent light source units 111 are apart from the optical sensor 113 at an equal distance. The optical sensor 113 is disposed in the position where the light that enters the optical sensor 113 from each of the six adjacent light source units 111 is affected by the partition wall 114 at substantially an equal degree.

Figure 15:
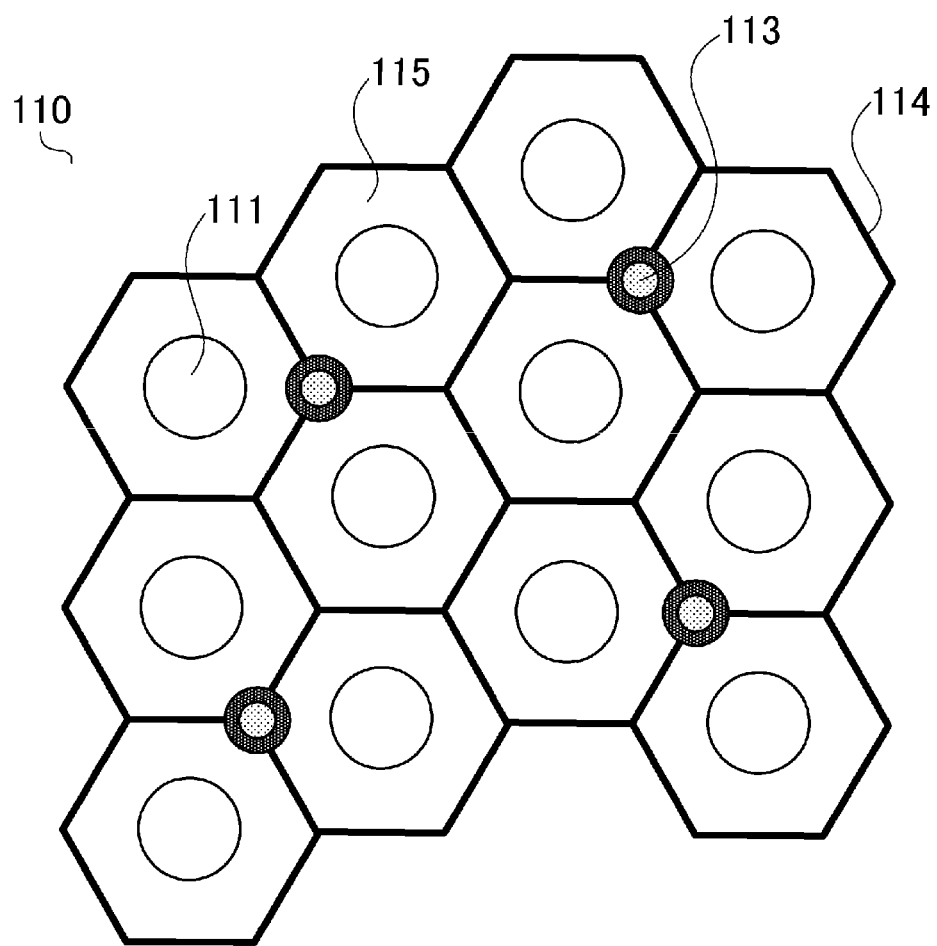
FIG. 15 is a front view showing other example of the configuration of the light source substrate according to Embodiment 1.

FIG. 15 is a diagram showing an example in which the shape of the divided regions 115 is a hexagonal shape. In this case, a single optical sensor 113 is provided among three proximate divided regions 115 when viewed in the direction perpendicular to the light source substrate 101 (LED substrate 110). The centers of the three proximate light source units 111 are apart from this optical sensor 113 at an equal distance. The optical sensor 113 is disposed in the position where the light that enters the optical sensor 113 from each of the three proximate light source units 111 is affected by the partition wall 114 at substantially an equal degree.

Although the present embodiment describes an example in which a plurality of LED substrates 110 and a plurality of light source units 111 are disposed in the form of a matrix, they do not have to be disposed in the form of a matrix. For instance, at least either the plurality of LED substrates 110 or the plurality of light source units 111 may be disposed in the form of houndstooth.

When the optical sensor 113 is disposed in the vicinity of a light source unit 111, an adequate amount of light enters the optical sensor 113 from the light source unit 111 located in the vicinity of the optical sensor 113. This allows the optical sensor 113 to detect, with high accuracy, the light that is emitted from the light source unit 111 disposed in the vicinity of the optical sensor 113. However, for a light source unit 111 that is not located in the vicinity of the optical sensor 113, the light that is emitted from this light source unit 111 and goes to the optical sensor 113 is blocked by the partition wall 114, preventing an adequate amount of light from entering the optical sensor 113. This prevents the optical sensor 113 from detecting, with high accuracy, the light that is emitted from the light source unit 111 that is not located in the vicinity of the optical sensor 113.

In the present embodiment, therefore, each optical sensor 113 is disposed in such a manner as to be overlapped with the partition wall 114 when viewed in the direction perpendicular to the light source substrate 101 (LED substrate 110).

Figure 4:
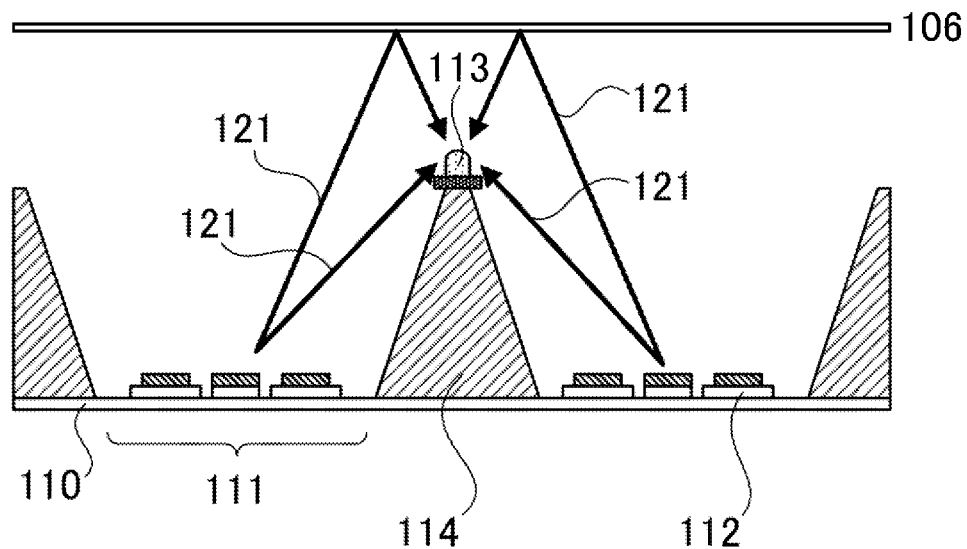
FIG. 4 is a cross-sectional diagram showing an example of the relationship between the positions of members according to Embodiment 1.

Specifically, each optical sensor 113 is provided as shown in FIG. 4. FIG. 4 is a cross-sectional diagram showing an example of the relationship between the positions of one of the LED substrates 110, the light source units 111, one of the optical sensors 113, the partition wall 114, and the optical sheet 106. FIG. 4 is a cross-sectional diagram obtained along a plane perpendicular to the light source substrate 101.

In the present embodiment, the light source unit 111 is isolated from other light source units 111 by the partition wall 114, as shown in FIG. 4. The height of the partition wall 114 is generally substantially half the distance between the light source substrate 101 (LED substrate 110) and the optical sheet 106.

It should be noted that the height of the partition wall 114 is not particularly limited. The taller the partition wall 114 is, the more effectively the expansion of the light emitted from the light source units 111 can be suppressed.

In the present embodiment, the optical sensor 113 is provided at the edge portion of the partition wall 114 that is located on the side opposite to the light source substrate 101, as shown in FIG. 4. For example, the optical sensor 113 is fixed to the LED substrate 110, with the inside of the partition wall 114 therebetween. According to such configuration, the partition wall 114 is fixed to the LED substrate 110 by fixing the optical sensor 113 to the LED substrate 110.

An adequate amount of light can enter the optical sensor 113 from the plurality of light source units 111 by disposing the optical sensor 113 in the position described above. This allows the optical sensor 113 to detect, with high accuracy, light 121 that is emitted from each of the plurality of light source units 111. The light 121 emitted from the light source units 111 is, for example, reflected off the optical sheet 106 and then enters the optical sensor 113, as shown in FIG. 4. Also as shown in FIG. 4, in some cases the light 121 emitted from the light source units 111 enters the optical sensor 113 directly.

It should be noted that, although the present embodiment describes an example in which the partition wall 114 is fixed to the LED substrate 110 by fixing the optical sensor 113 to the LED substrate 110, the configuration of the present embodiment is not limited thereto. For instance, a fixing member for fixing the partition wall 114 to the LED substrate 110 may be further provided.

Figure 5A:
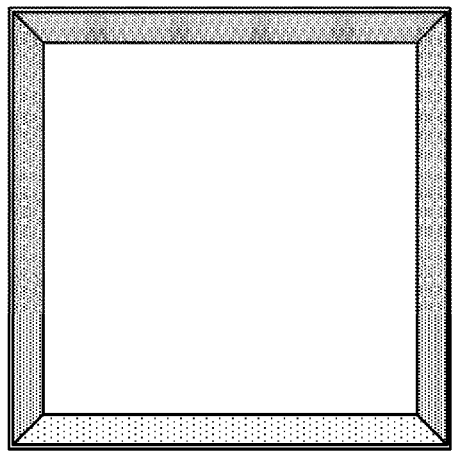
FIGS. 5A and 5B are each a diagram showing an example of members configuring a partition wall according to Embodiment 1.
Figure 5B:
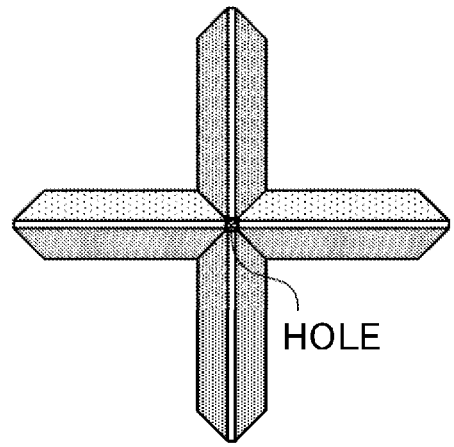

FIGS. 5A and 5B are each a diagram showing an example of members configuring the partition wall 114. In the present embodiment, a member in the shape of a quadrangle (quadrangular member) shown in FIG. 5A and a member in the shape of a cross (cross member) shown in FIG. 5B are combined to configure the partition wall 114. Specifically, the quadrangular members are arranged on the LED substrate 110 so as to be adjacent to each other, and the cross member is placed to cover the four adjacent quadrangular members (the four sides forming a cross), thereby configuring the partition wall 114. As shown in FIG. 5B, the center of the cross member is provided with a hole (opening portion). The optical sensor 113 is fixed to the LED substrate 110 through the hole of the cross member, thereby fixing the partition wall 114.

The members configuring the partition wall 114 are not limited to those shown in FIGS. 5A and 5B. For example, the partition wall 114 may be configured with one member.

Figure 6:
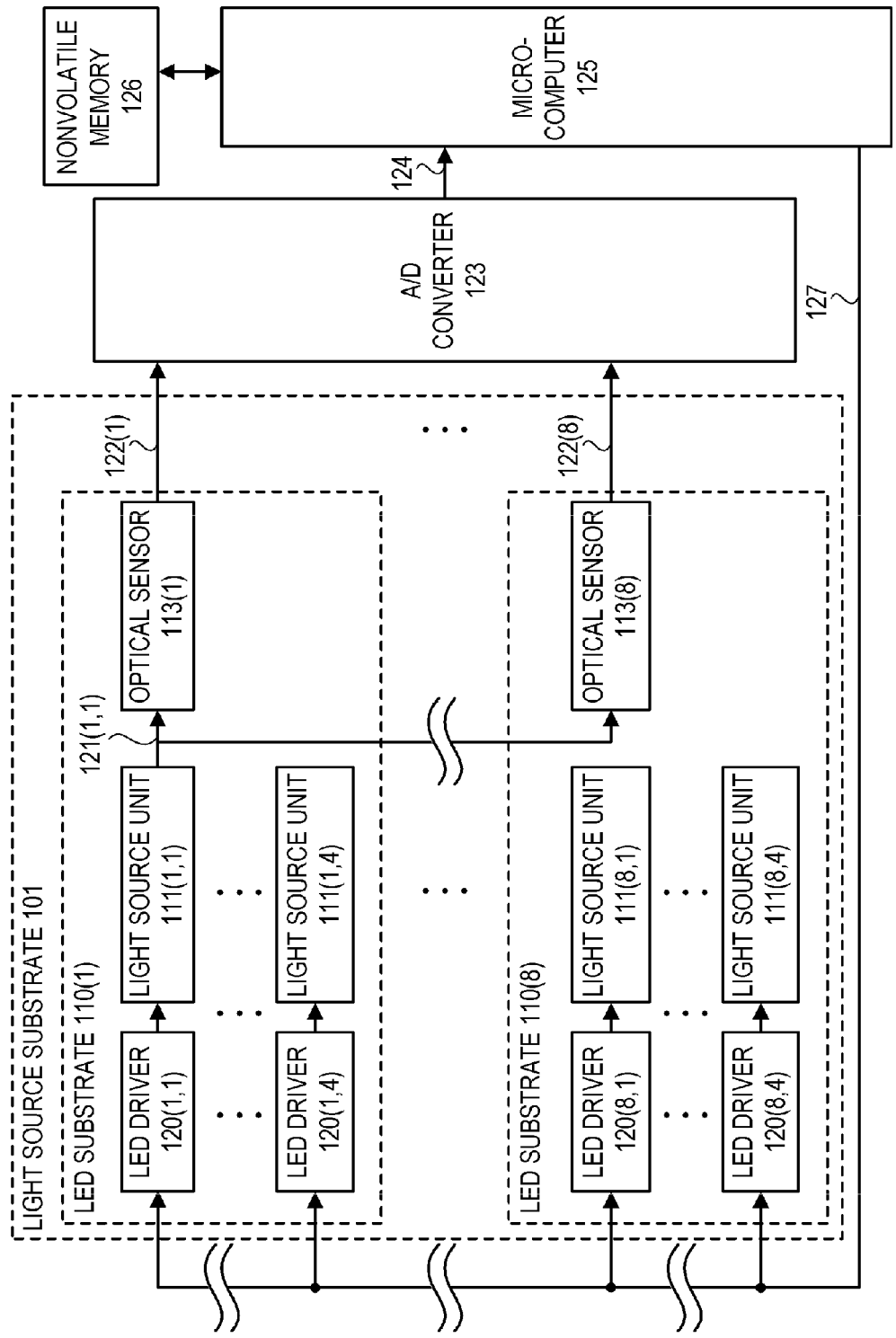
FIG. 6 is a block diagram showing an example of the configuration of a backlight apparatus according to Embodiment 1.

FIG. 6 is a block diagram showing an example of the configuration of the backlight apparatus. In the present embodiment, the light source substrate 101 has eight LED substrates 110(1) to 110(8). Because the eight LED substrates 110(1) to 110(8) have the identical configuration, the LED substrate 110(1) is now described as a representative example. The LED substrate 110(1) has light source units 111(1, 1) to 111(1, 4). The light source units 111(1, 1) to 111(1, 4) are driven by LED drivers 120(1, 1) to 120(1, 4), respectively.

In the present embodiment, a light emission adjustment process is executed on a regular basis or at specific timing in order to reduce variations in the light emission characteristics of the plurality of light source units 111 which occur due to variations in the temperatures and time-related deterioration of the plurality of light source units 111.

Variations in the light emission characteristics of the plurality of light source units 111 causes variations in the light emission brightnesses of the plurality of light source units 111, as well as variations in the emission colors of the plurality of light source units 111. As a result, uneven light is emitted from the backlight apparatus. For example, variations in the light emission brightnesses of the plurality of light source units 111 causes the backlight apparatus to emit light of uneven brightness. Consequently, variations in the emission colors of the plurality of light source units 111 causes the backlight apparatus to emit light of uneven colors.

The light emission adjustment process can reduce such uneven brightness of light emitted from the backlight apparatus, as well as the uneven colors of the light emitted from the backlight apparatus.

An example of reducing such uneven brightness of light emitted from the backlight apparatus is described below.

All of the light source units 111 are turned on during a normal operation.

In the light emission adjustment process, the plurality of light source units 111 are turned on, one by one, in a predetermined order, and the light emitted from each of the light source units 111 is detected with a corresponding optical sensor 113. The light emission brightnesses of the light source units 111 are adjusted based on the detection values obtained by the optical sensor 113.

FIG. 6 shows an illuminated state in which a detect ion value for adjusting the light emission brightness of the light source unit 111(1, 1) is obtained. In FIG. 6, the light source unit 111(1, 1) is turned on, while the other light source units 111 are turned off. Most of the light 121(1, 1) emitted from the light source unit 111(1, 1) enters the color liquid crystal panel 105 (not shown in FIG. 6). However, some of the light 121(1, 1) returns from the optical sheet 106 (not shown in FIG. 6) toward the light source unit in the form of reflected light and enters each optical sensor 113. It should be noted that the light 121(1, 1) sometimes enters directly to some of the optical sensors 113, as shown in FIG. 4.

In response to the brightness of the detected light, each of the optical sensors 113 outputs an analogue value 122 (detection value) representing this brightness. Of the analogue values 122 that are output by the optical sensors 113, an A/D converter 123 selects an analogue value 122(1, 1) that is output by an optical sensor 113(1, 1) that is associated with the light source unit 111(1, 1) beforehand. The A/D converter 123 then converts the selected analogue value into a digital value and outputs this digital value 124 to a microcomputer 125. The optical sensor 113 that is associated with the light source unit 111 beforehand is used to adjust the light emission brightness of this light source unit 111. Thus, this optical sensor is referred hereinafter as "optical sensor for adjustment."

The same process is executed for the other light source units 111. In other words, in a state in which only the light source unit 111 to be processed is turned on, the light thereof is detected by each optical sensor 113. Then, the A/D converter 123 converts the analogue value 122 of the optical sensor 113 for adjustment that is associated beforehand with the light source unit 111 whose emission brightness is to be adjusted, into the digital value 124, and outputs the digital value 124 to the microcomputer 125.

The microcomputer 125 adjusts the emission brightness of the light source unit 111 based on the detected value obtained by the optical sensor 113 (the digital value 124, to be precise). In the present embodiment, the microcomputer 125 adjusts, for each of light source unit, the light emission brightness of the light source unit based on the detection value obtained from the optical sensor for adjustment. Specifically, a target brightness value (target detection value) of each light source unit 111 that is determined upon the manufacturing inspection of the color image display apparatus is stored in a nonvolatile memory 126. With respect to each of the light source units 111, the microcomputer 125 compares the target values with the detection values of the optical sensors 113 associated with the light source units 111. The microcomputer 125 then adjusts the emission brightness of each light source unit 111 in response to the result of the comparison in such a manner that the detection values match the target values. The light emission brightnesses are adjusted by, for example, adjusting an LED driver control signal 127 that is output from the microcomputer 125 to each of the LED drivers 120. The LED drivers 120 drive the light source units 111 in response to the LED driver control signals 127. The LED driver control signals each represent a pulse width of a pulse signal applied to the light source units 111 (a pulse signal of a current or voltage). In this case, the light emission brightnesses of the light source units 111 are subjected to PWM control through adjustments of the LED driver control signals. Uneven brightness of the light emitted from the backlight apparatus can be reduced by adjusting the light emission brightness of each of the light source units 111 in such a manner that the detection values match the target values.

It should be noted that the LED driver control signal is not limited to a signal representing a pulse width. For example, the LED driver signal may represent the peak value of a pulse signal applied to each light source unit 111 or both a pulse width and the peak value.

According to the present embodiment described above, an optical sensor is provided at the edge portion of a partition wall that is located on the side opposite to the light source substrate. Therefore, the light that is emitted from each of the light source units of the light source apparatus having the individual partition structure (the structure in which each of the light source units is isolated from other light source units) can be detected, with high accuracy, with the optical sensors, the number of which is less than the number of light source units. Reducing the number of optical sensors can prevent the cost increases.

Embodiment 2

A display apparatus, a light source apparatus, and a method for controlling these apparatuses according to Embodiment 2 of the present invention are described below.

Embodiment 1 has described an example in which the optical sensors 113 are provided at the edge portions of the partition wall 114. The present embodiment describes an example in which the optical sensors 113 are disposed inside the partition wall 114.

It should be noted that the descriptions of the functions and configurations same as those of Embodiment 1 are omitted.

Figure 7:
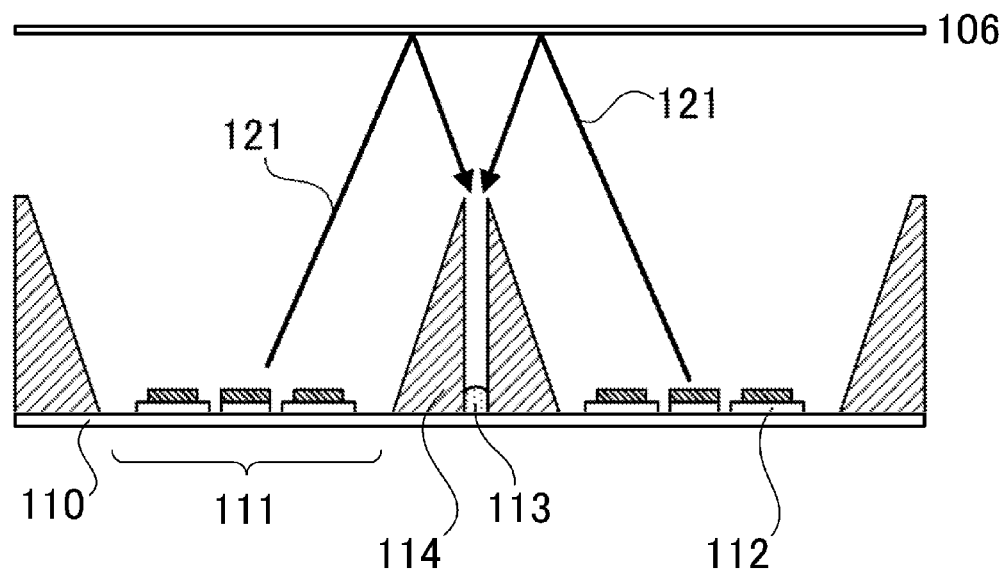
FIG. 7 is a cross-sectional diagram showing an example of the relationship between the positions of members according to Embodiment 2.

FIG. 7 is a cross-sectional diagram showing an example of the relationship between the positions of members according to the present embodiment. Specifically, FIG. 7 is a cross-sectional diagram showing an example of the relationship between the positions of one of the LED substrates 110, the light source units 111, one of the optical sensors 113, the partition wall 114, and the optical sheet 106.

In the present embodiment, as shown in FIG. 7, a hole (opening portion) that is substantially perpendicular (or perpendicular) to the light source substrate 101 is provided at a part of the partition wall 114 that is closer to the optical sheet 106 (the side opposite to the light source substrate 101). The optical sensor 113 is provided on the inside of the hole provided in the partition wall 114.

Disposing the optical sensor 113 in this position allows an adequate amount of light to enter the optical sensor 113 from the plurality of light source units 111. Therefore, the optical sensor 113 can detect, with high accuracy, light 121 that is emitted from each of the plurality of light source units 111. The light 121 emitted from each light source unit 111 is reflected off the optical sheet 106 and then enters the optical sensor 113 through the hole, as shown in FIG. 7.

In the example shown in FIG. 7, the hole is provided at the edge portion of the partition wall 114 that is located on the side opposite to the light source substrate 101; however, the configuration of the present embodiment is not limited thereto. The hole may be provided at a position shifted from the edge portion described above. However, in view of the accuracy of the detection of light, it is preferred that the hole be provided at the edge portion described above. As long as the hole is provided at this edge portion, the light reflected off the optical sheet 106 can be prevented from being blocked by the partition wall 114, enabling highly accurate detection of the light.

In the example shown in FIG. 7, the hole extends from the side near the optical sheet 106 toward the light source substrate 101; however, the configuration of the present embodiment is not limited thereto. For instance, the hole may be in the form of a depressed portion that does not penetrate into the light source substrate 101.

According to the present embodiment, as described above, the hole (opening portion) that is substantially perpendicular to the light source substrate is provided at the part of the partition wall that is located on the side opposite to the light source substrate, and then the optical sensor is provided on the inside of this hole. Such a configuration enables highly accurate detection of the light emitted from each of the light source units of the light source apparatus having the individual partition structure through the use of the optical sensors, the number of which is less than the number of light source units. Reducing the number of optical sensors can prevent the cost increases.

The configuration of the present embodiment is favorable when using a color sensor as each optical sensor. A detection surface of the color sensor is provided with a flat color filter, wherein light radiated onto the detection surface without passing through the color filter (oblique light) expands an error of a detection value. According to the present embodiment, because the light emitted from each light source unit enters the corresponding optical sensor through the hole, the oblique light mentioned above can be prevented from entering the optical sensor. It is therefore preferred that the configuration of the present embodiment be applied when using the color sensor as each optical sensor.

Figure 8:
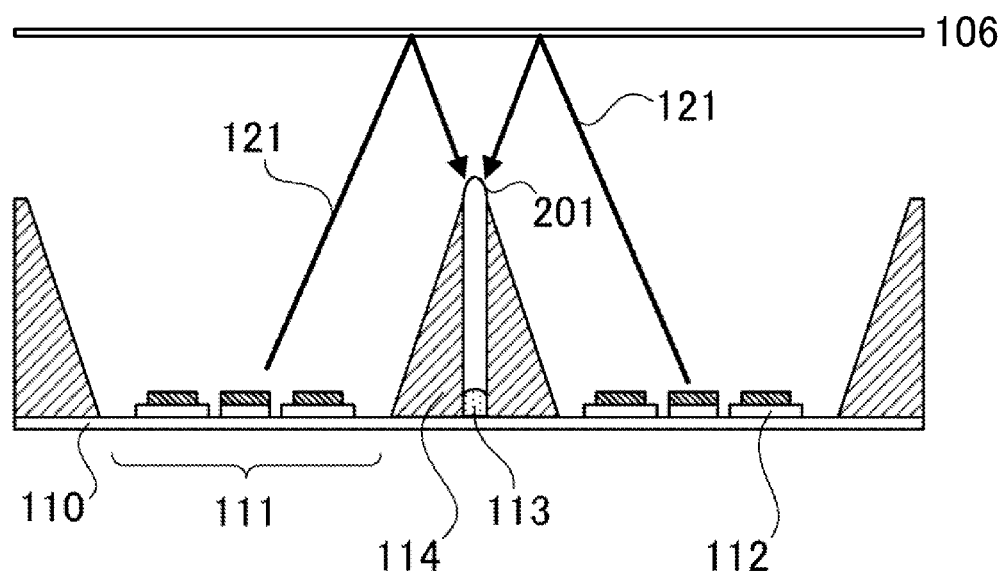
FIG. 8 is a cross-sectional diagram showing an example of the relationship between the positions of the members according to Embodiment 2.

As shown in FIG. 8, it is preferred that a light-condensing member 201 be provided at the edge portion of the hole closer to the optical sheet 106 (the side opposite to the light source substrate 101) in order to condense the light entering the hole on the side where the optical sensor 113 is provided. The light-condensing member 201 can increase the amount of light that enters the optical sensor 113, enhancing the detection accuracy of the optical sensor 113. A condenser lens, a light-guiding member or the like, for example, can be used as the light-condensing member 201. The material of the light-condensing member 201 can be, for example, transparent resin.

Embodiment 3

A display apparatus, a light source apparatus, and a method for controlling these apparatuses according to Embodiment 3 of the present invention are described below.

The present embodiment describes other example in which the optical sensors 113 are disposed inside the partition wall 114.

It should be noted that the descriptions of the functions and configuration same as those of Embodiment 1 are omitted.

Figure 9:
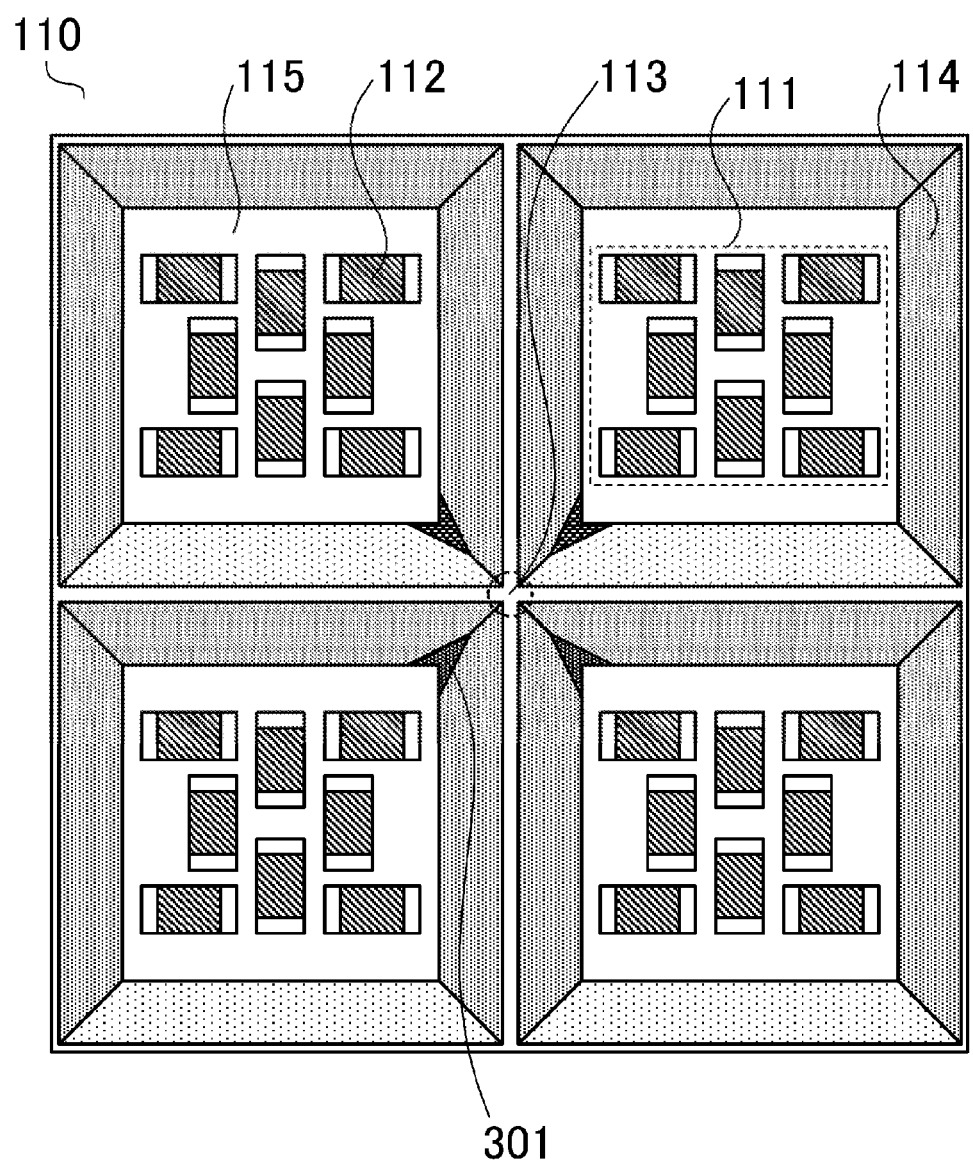
FIG. 9 is a front view showing an example of the configuration of an LED substrate according to Embodiment 3.

FIG. 9 is a front view showing an example of the configuration of one of the LED substrates 110 according to the present embodiment. In other words, FIG. 9 is a schematic diagram showing an example of the configuration of the LED substrate 110 viewed from the front.

Figure 10:
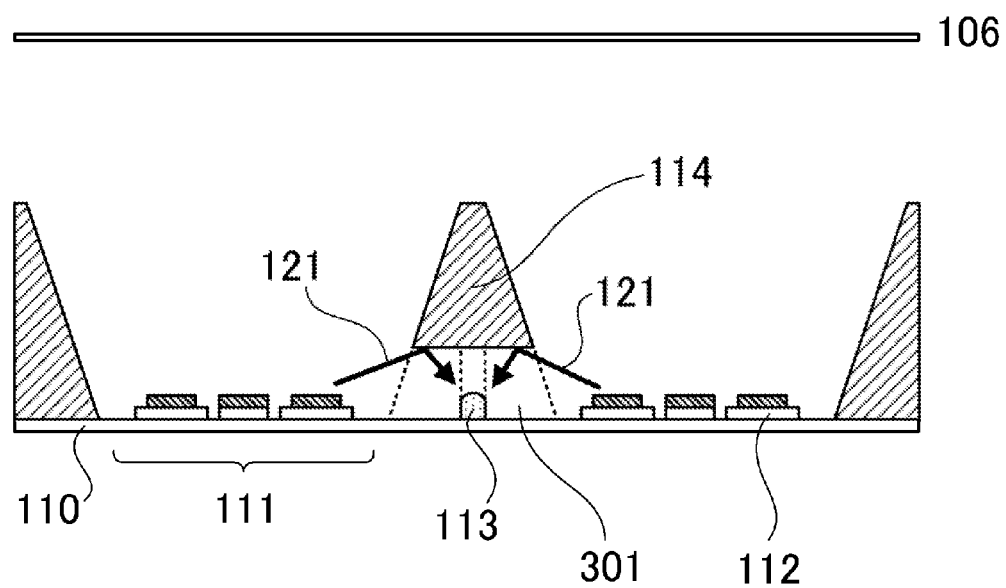
FIG. 10 is a cross-sectional diagram showing an example of the relationship between the positions of members according to Embodiment 3.

FIG. 10 is a cross-sectional diagram showing an example of the relationship between the positions of members according to the present embodiment. Specifically, FIG. 10 is a cross-sectional diagram showing an example of the relationship between the positions of the LED substrate 110, the light source units 111, one of the optical sensors 113, the partition wall 114, and the optical sheet 106.

In the present embodiment, as shown in FIGS. 9 and 10, the partition wall 114 is provided with a hole (opening portion) 301 that extends from a shielding surface corresponding to one of the light source units 111 and passes through one or more shielding surfaces corresponding to one or more adjacent light source units 111. Specifically, the partition wall at the central portion surrounded by four divided regions 115 arranged in 2 rows×2 columns is provided with a hole that extends from the shielding surfaces surrounding the light source unit of one of these four divided regions 115 and passes through the three shielding surfaces that surround the three light source units of the remaining three divided regions 115.

The optical sensor 113 is provided inside the hole 301 provided in the partition wall 114. Specifically, the optical sensor 113 in the hole 301 provided at the partition wall 114 is provided on the LED substrate 110 (on the light source substrate). The optical sensor 113 in the hole 301 of the partition wall 114 may be provided on the internal surface of the hole 301. However, providing the optical sensor 113 on the LED substrate 110 makes it easier to perform wiring when installing the optical sensor 113.

In the examples shown in FIGS. 9 and 10, one optical sensor 113 is provided with respect to a total of four light source units 111 arranged in 2 rows×2 columns. Also, the optical sensor 113 is disposed so as to be overlapped with the partition wall 114 when viewed in the direction perpendicular to the LED substrate 110 (light source substrate 101).

In addition, in the examples shown in FIGS. 9 and 10, one optical sensor 113 is provided among the four proximate light source units 111 when viewed in the direction perpendicular to the LED substrate 110 (the light source substrate 101). Furthermore, the one optical sensor 113 is provided among the four proximate divided regions 115 when viewed in the direction perpendicular to the light source substrate 101 (the LED substrate 110). The centers of the four proximate light source units 111 are apart from the optical sensor 113 at an equal distance. The optical sensor 113 is disposed in the position where the light that enters the optical sensor 113 from each of the four proximate light source units 111 is affected by the partition wall 114 at substantially an equal degree.

An adequate amount of light can enter the optical sensor 113 from the plurality of light source units 111 by disposing the optical sensor 113 in the position described above. This allows the optical sensor 113 to detect, with high accuracy, light 121 that is emitted from each of the plurality of light source units 111. The light 121 emitted from the light source units 111 enters directly to the optical sensor 113 through the hole, as shown in FIG. 10.

It should be noted in the example shown in FIG. 10 that the hole 301 is provided at the edge portion of each partition wall 114 that is closer to the light source substrate 101 and apart of the surface of the LED substrate 110 is used as apart of the inner surface of the hole 301; however, the configuration of the present embodiment is not limited thereto. The hole may be provided away from the light source substrate 101 so that the entire inner surface of the hole 301 is configured by apart of a surface of the partition wall 114.

In the example shown in FIG. 10, the hole 301 is parallel to the light source substrate 101; however, the configuration of the present embodiment is not limited thereto. For example, the hole does not have to be parallel to the light source substrate 101, and also the hole may be configured in such a manner that the diameter of the hole is different depending on the position in the hole. However, in view of the accuracy of the detection of light, it is preferred that the hole be substantially parallel (or parallel) to the light source substrate 101.

Furthermore, the present embodiment has described an example in which one optical sensor 113 is provided to one LED substrate 110, but the configuration of the present embodiment is not limited thereto. For example, a single optical sensor 113 may be provided for every two or more LED substrates 110.

Figure 16:
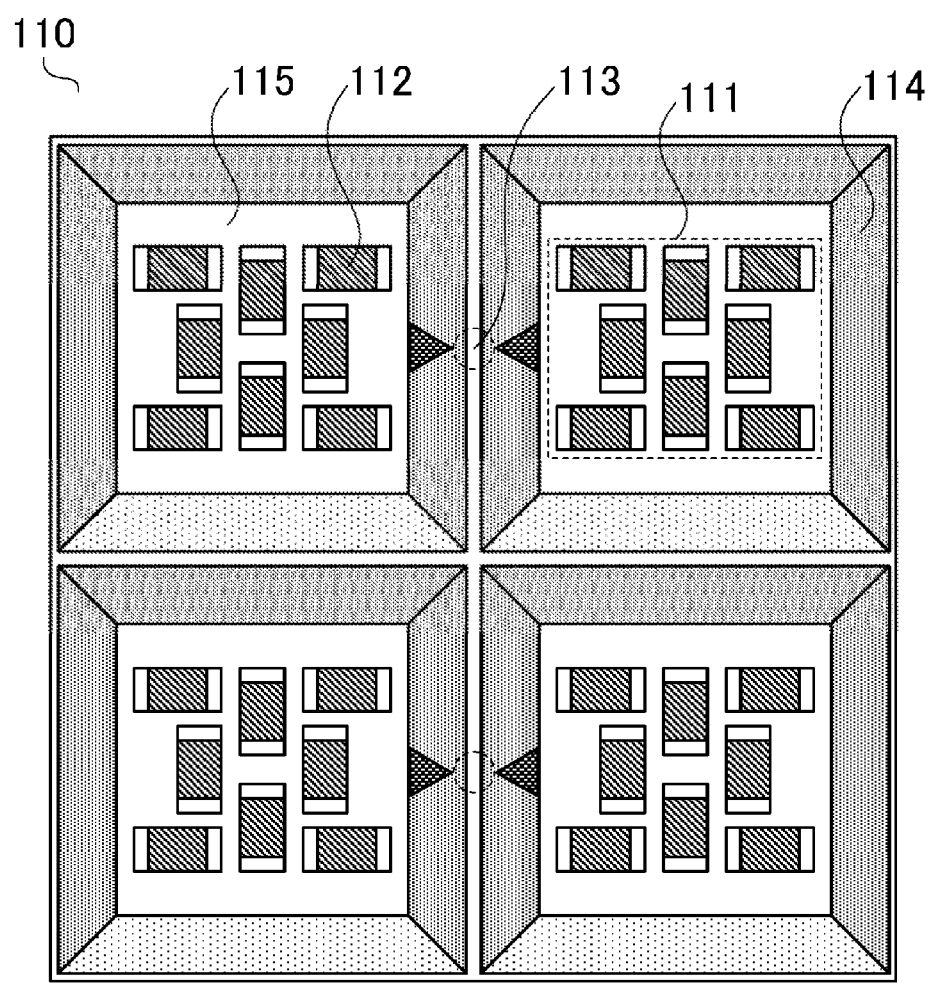
FIG. 16 is a front view showing other example of the configuration of the LED substrate according to Embodiment 3.

Alternatively, two or more optical sensors 113 may be provided with respect to one LED substrate 110. For example, one optical sensor 113 corresponding to two adjacent light source units 111 may be provided between these two light source units 111 when viewed in the direction perpendicular to the light source substrate 110 (the LED substrate 110), as shown in FIG. 16. In this case, two optical sensors 113 are provided with respect to one LED substrate 110. In this case as well, the optical sensors 113 are disposed in such a manner as to be overlapped with the partition wall 114 when viewed in the direction perpendicular to the light source substrate 101 (LED substrate 110). Also, a single optical sensor 113 is provided between two adjacent divided regions 115 when viewed in the direction perpendicular to the light source substrate 101 (LED substrates 110). The centers of the two adjacent light source units 111 are apart from the optical sensor 113 at an equal distance. The optical sensor 113 is disposed in the position where the light entering the optical sensor 113 from each of the two adjacent light source units 111 is affected by the partition wall 114 at substantially an equal degree.

Although the present embodiment has described an example in which the shape of the divided regions 115 is a quadrangle, the shape of the divided regions 115 is not limited thereto. For instance, the shape of the divided regions 115 may be a triangle (see FIG. 14), a pentagon, a hexagon (see FIG. 15), a circle, and the like.

As described above, according to the present embodiment, the partition wall is provided with the hole (opening portion) that extends from a shielding surface corresponding to a light source unit and passes through one or more shielding surfaces corresponding to one or more adjacent light source units. An optical sensor is provided inside the hole. Therefore, the light that is emitted from each of the light source units of the light source apparatus with the individual partition structure can be detected with high accuracy by using the optical sensors, the number of which is lower than the number of light source units. Reducing the number of optical sensors can prevent the cost increases.

According to the present embodiment, the light emitted from each of the light source units enters the corresponding optical sensor directly. In other words, before being reflected off the optical sheet, the light enters the optical sensor directly. Therefore, the light emitted from each of the light source units can be detected with higher accuracy. Specifically, a detection value with a suppressed error (detection value of the optical sensor) can be obtained, the error being caused due to a change in the state of the optical sheet such as deflection thereof.

Also according to the present embodiment, because the optical sensor 113 is provided inside the hole 301 of the partition wall 114, the optical sensor 113 does not block the light emitted from each of the light source units 111 and goes to the optical sheet 106 and color liquid crystal panel 105.

Embodiment 4

A display apparatus, a light source apparatus, and a method for controlling these apparatuses according to Embodiment 4 of the present invention are described below.

The present embodiment describes an example of preventing the cost increases by reducing the number of processing circuits that process the output signals of the optical sensors.

Figure 11:
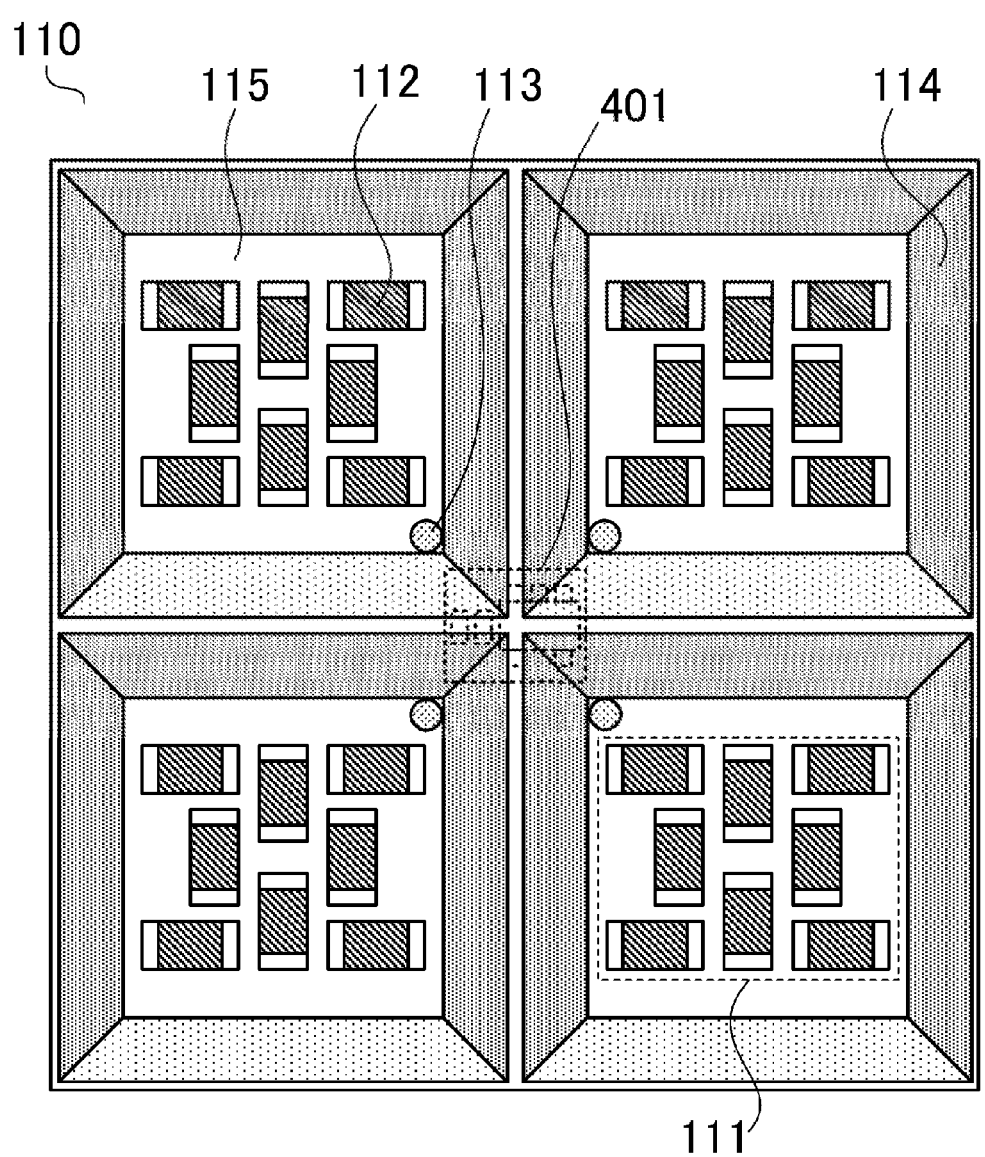
FIG. 11 is a front view showing an example of the configuration of an LED substrate according to Embodiment 4.

FIG. 11 is a front view showing an example of the configuration of one of the LED substrates 110 according to the present embodiment. In other words, FIG. 11 is a schematic diagram showing an example of the configuration of the LED substrate 110 viewed from the front.

In the present embodiment, the optical sensor 113 is provided for each light source unit, as shown in FIG. 11. Specifically, the light source unit 111 and optical sensor 113 are provided for each of a plurality of divided regions 115.

In the present embodiment, a single processing circuit 401 processes the output signals of two or more optical sensors 113. The single processing circuit 401 is shared for the two or more optical sensors 113. This can make the number of processing circuits 401 lower than the number of optical sensors 113, achieving cost reduction.

Specifically, the output signals of the two or more optical sensors 113 corresponding to two or more light source units 111 that are adjacent to each other are processed by the single processing circuit 401. In other words, the output signals of the two or more optical sensors 113 provided in two or more divided regions 115 that are adjacent to each other are processed by the single processing circuit 401.

Furthermore, the processing circuit 401 is provided inside the partition wall 114 in the present embodiment. For this reason, the light emitted from the light source units 111 can be prevented from being blocked by the processing circuit 401. Moreover, each region where the LED chips 112 can be disposed can be expanded.

Specifically, according to the present embodiment, the processing circuit 401 is provided inside the partition wall at the central portion surrounded by the two or more divided regions 115 that are adjacent to each other. Then, the optical sensors 113 are each provided at the edge portion of each of the two or more divided regions that are adjacent to each other, the edge portions being located on the side where the processing circuit 401 (the processing circuit 401 in the central portion) is provided. Disposing the processing circuit 401 and the optical sensors 113 in these positions can reduce the length of the wiring between each optical sensor 113 and the processing circuit 401.

It should be noted that the wiring between each optical sensor 113 and the processing circuit 401 may be performed on the LED substrate 110, eliminating the need to provide the hole (opening portion) in the partition wall 114.

More specifically, in the example shown in FIG. 11, the processing circuit 401 is provided inside the partition wall at the central portion surrounded by a total of four divided regions 115 arranged in 2 rows×2 columns. This configuration can prevent the light emitted from the light source units 111 from being blocked by the processing circuit 401. Moreover, each region where the LED chips 112 can be disposed can be expanded.

In addition, the optical sensors 113 are each provided at the edge portion of each of the four divided regions, the edge portions being located on the side where the processing circuit 401 (the processing circuit 401 in the central portion) is provided. The output signals of the four optical sensors 113 provided in the respective four divided regions 115 are processed by this processing circuit 401. Thus, not only is it possible to reduce the length of the wiring between each optical sensor 113 and the processing circuit 401, but also the number of processing circuits 401 can be reduced to a quarter of the number of optical sensors 113.

Figure 12:
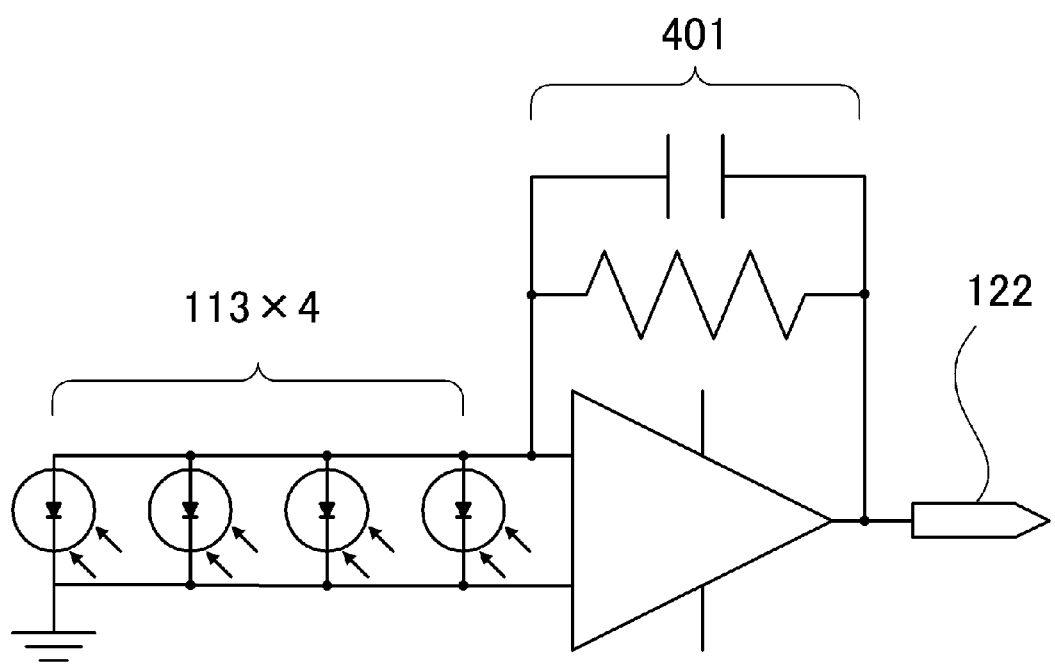
FIG. 12 is a circuit diagram showing an example of a method for connecting an optical sensor and a processing circuit, according to Embodiment 4.

FIG. 12 is a circuit diagram showing an example of a method for connecting the four optical sensors 113 to the processing circuit 401.

As shown in FIG. 12, the four optical sensors 113 are connected in parallel to the processing circuit 401. The sum of currents that are output from the four optical sensors 113 in accordance with the amount of light (photoelectric currents; output signals) is input to the processing circuit 401. The processing circuit 401 converts the photoelectric currents into voltages and executes an output impedance adjustment thereon. The processing circuit 401 has, for example, an operational amplifier, a resistor, a capacitor, and the like. The processing circuit 401 outputs analogue values 122 representing the detection values of the optical sensors 113 (detected brightnesses, detected colors, etc.).

According to the present embodiment described above, the output signals of two or more optical sensors are processed by a single processing circuit. Therefore, the number of processing circuits can be made lower than the number of optical sensors, achieving cost reduction. Also, according to the present embodiment, because a light source unit and an optical sensor are provided in each of the plurality of divided regions, the light emitted from each light source unit can be detected with high accuracy.

The present embodiment has described an example in which a light source unit and an optical sensor are provided in each of the plurality of divided regions; however, the configuration of the present embodiment is not limited thereto. For example, the optical sensors may be provided in the positions described in Embodiments 1 to 3.

It should be noted that, although the present embodiment has described an example in which the same number of optical sensors as that of the light source units are provided, the configuration of the present embodiment is not limited thereto. For example, one optical sensor may be provided for every two or more light source units, as described in Embodiments 1 to 3.

The present embodiment has also described an example in which a single processing circuit is provided for every four optical sensors that are provided respectively in four divided regions that are adjacent to each other; however, the configuration of the present embodiment is not limited thereto. For example, a single processing circuit may be provided for every two optical sensors that are not adjacent to each other. In addition, a single processing circuit may be provided for every two or more optical sensors that are not adjacent to each other.

The present embodiment has also described an example in which the processing circuit is provided inside the partition wall at the central portion surrounded by the two or more divided regions that are adjacent to each other; however, the configuration of the present embodiment is not limited thereto. For instance, the processing circuit may be provided inside the partition wall at a location other than the central portion described above. Alternatively, the processing circuit may be provided outside the partition wall. However, it is preferred that the processing circuit be provided in a location where the light from each light source unit is not blocked.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-116468, filed on Jun. 5, 2014, and Japanese Patent Application No. 2015-061208, filed on Mar. 24, 2015, which are hereby incorporated by reference herein in their entirety.

What is claimed is:

1. A light source apparatus, comprising:
a substrate;
a plurality of light source units provided on the substrate;
a partition wall provided on the substrate and surrounding each of the light source units; and
a plurality of optical sensors, each of which is disposed between two or more of the light source units that are adjacent to each other,
wherein the number of optical sensors is lower than the number of light source units, and
each optical sensor is provided at an upper edge portion of the partition wall that is located on a side opposite to the substrate or inside of an opening portion of the partition wall.

2. The light source apparatus according to claim 1, wherein the optical sensor is provided for every two or more of the light source units.

3. The light source apparatus according to claim 1, wherein centers of the two or more light source units that are adjacent to each other are apart from the optical sensor at substantially an equal distance.

4. The light source apparatus according to claim 3, wherein the centers of the two light source units that are adjacent to each other are apart from the optical sensor at substantially an equal distance.

5. The light source apparatus according to claim 3, wherein the centers of four of the light source units that are adjacent to one another are apart from the optical sensor at substantially an equal distance.

6. The light source apparatus according to claim 1, wherein
a region of the substrate is divided into a plurality of divided regions by the partition wall,
the light source units are provided in the plurality of divided regions respectively, and
the optical sensor is disposed between two or more of the divided regions that are adjacent to each other.

7. The light source apparatus according to claim 1, wherein the optical sensor is disposed in a position where light that enters the optical sensor from each of the two or more light source units that are adjacent to each other is affected by the partition wall at substantially an equal degree.

8. The light source apparatus according to claim 1, wherein
the partition wall is provided with the opening portion in a direction substantially perpendicular to the substrate, and
the optical sensor is provided inside the opening portion.

9. The light source apparatus according to claim 8, further comprising a light-condensing member that is provided at an upper edge portion of the opening portion that is located on a side opposite to the substrate, in order to condense light entering the opening portion on a side where the optical sensor is provided.

10. The light source apparatus according to claim 1, wherein
the partition wall has a shielding surface corresponding to each of the light source units for shielding light that is emitted from the light source unit and goes toward other light source unit,
the partition wall is provided with the opening portion that extends from the shielding surface corresponding to one of the light source units and passes through one or more shielding surfaces corresponding to adjacent one or more of the light source units, and
the optical sensor is provided inside the opening portion.

11. The light source apparatus according to claim 10, wherein the opening portion is substantially parallel to the substrate.

12. The light source apparatus according to claim 1, wherein the optical sensor is provided on the substrate.

13. The light source apparatus according to claim 1, further comprising:
a processing circuit configured to process output signals of the optical sensors,
wherein the number of processing circuits is lower than the number of optical sensors, and
the processing circuit processes output signals of two or more of the optical sensors.

14. The light source apparatus according to claim 13, wherein the processing circuits are provided inside the partition wall.

15. A light source apparatus, comprising:
a substrate;
a plurality of light source units provided on the substrate;
a partition wall provided on the substrate and surrounding each of the light source units;
a plurality of optical sensors configured to detect light emitted from the light source units; and
a plurality of processing circuits configured to process output signals of the optical sensors,
wherein the number of processing circuits is lower than the number of optical sensors, and
the processing circuits are provided inside the partition wall.

16. The light source apparatus according to claim 15, wherein
the optical sensors are provided for the light source units respectively, and
the processing circuits process output signals of two or more of the optical sensors corresponding to two or more of the light source units that are adjacent to each other.

17. The light source apparatus according to claim 15, wherein the processing circuits process output signals of two or more of the optical sensors.

18. A display apparatus, comprising:
the light source apparatus according to claim 1; and
a display unit configured to display an image on a screen by modulating light emitted from the light source apparatus.

* * * * *